June 23, 1931. G. B. IRELAND 1,811,178
MERCURY PRESSURE GAUGE
Filed July 26, 1928
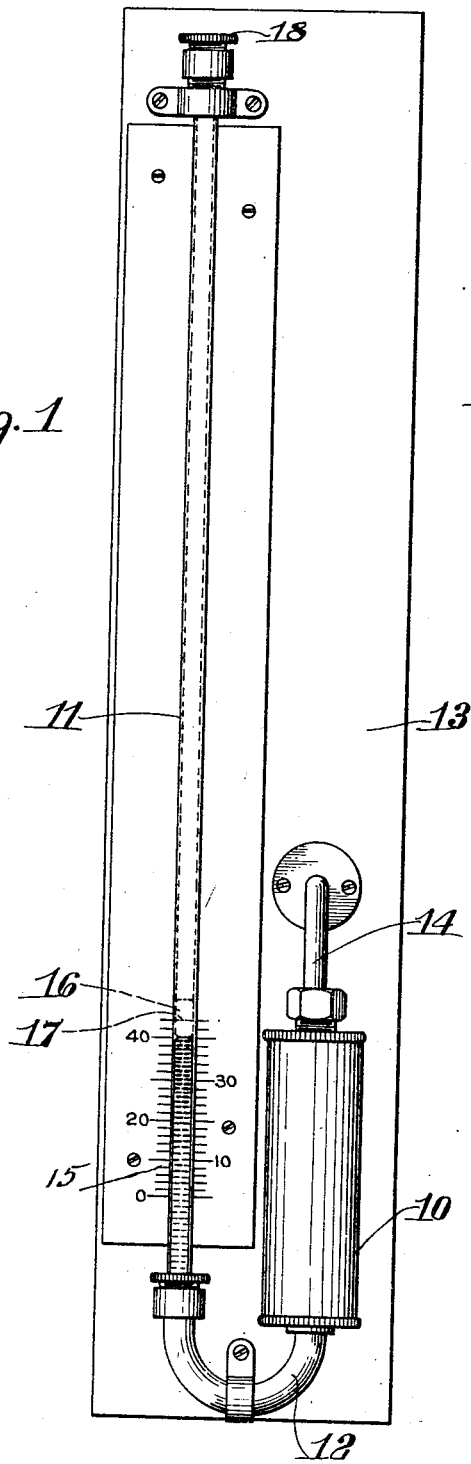
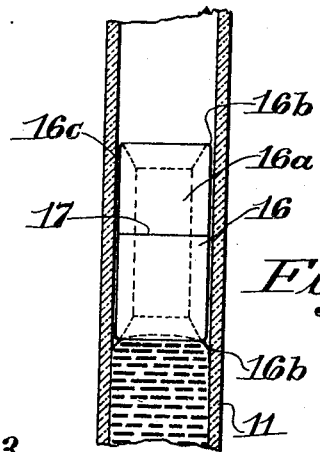
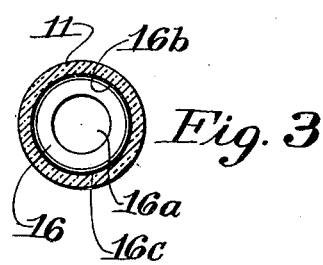
INVENTOR:
George B. Ireland
BY
Alfred Burger
ATTORNEY Patented June 23, 1931

1,811,178

UNITED STATES PATENT OFFICE

GEORGE B. IRELAND, OF ROCHESTER, NEW YORK, ASSIGNOR TO TAYLOR INSTRUMENT COMPANIES, OF ROCHESTER, NEW YORK, A CORPORATION OF NEW YORK

MERCURY PRESSURE GAUGE

Application filed July 26, 1928. Serial No. 295,414.

This invention relates to pressure gauges of the type in which a column of mercury is balanced against the pressure to be measured and more in particular to a pressure gauge for accurately calibrating and checking sphygmomanometers.

As is well known, mercury is a non-wetting liquid and for this reason, the surface of a column of mercury confined in a tube rises from the wall of the tube toward the center and thus defines a convex meniscus. In instruments of the type referred to, the difference between the base and the crest of the meniscus is appreciable and may cause, at least for relatively inexperienced persons, appreciable errors in the reading. This danger of error must be, as much as possible, avoided in connection with the calibration of certain instruments, such as sphygmomanometers.

It has heretofore been proposed, in order to facilitate the reading of the gauge, to place on the mercury column a cylindrical float provided with a colored horizontal line.

Such a float, however, has various disadvantages. In the first instance, in use, if some of the mercury should be forced to the top of the float, it cannot be shaken down through the clearance space between the wall of the tube and the float. Secondly, in shipment, the float cannot be shipped in position in the tube, but must be introduced after arrival at the place of use.

The present invention has for its object a float which obviates the difficulties heretofore met with.

For a full understanding of the invention, reference is made to the accompanying drawings, wherein:

Fig. 1 is a front elevation of a device embodying the invention;

Fig. 2 is a fragmentary sectional view on a larger scale showing the invention; and Fig. 3 is a plan view of the member constituting the invention proper.

Having reference to Fig. 1, 10 represents a reservoir, 11 a glass tube and 12 a U-shaped connection, mounted as a unit on a support 13. The reservoir has at its upper end a fitting 14 for connection with a rubber bulb or other pneumatic pressure device (not shown). The upper end of the tube 11 is closed by a closure permitting, in operation, air to pass in and out of the tube, but retaining the mercury.

When air or gas is forced into the reservoir, the increase of pressure causes a rise of the mercury column in tube 11 until a balance is reached between the weight of the column and the pressure acting upon the mercury in the reservoir. The top of the mercury column is then read against the adjoining scale 15.

The construction thus far described is part of the prior art.

The invention is a tubular float 16. As appears from Fig. 2, the bore 16a of the float is widened at the ends substantially to the periphery and thus defines thin edges 16b. The float is preferably made of celluloid, bone, ivory or the like, on which is placed a line of reference 17, preferably in red color.

The significance of the arrangement is as follows:

Assume that, in use, the mercury column in tube 11 is caused to rise until its upper surface comes into contact with the closure 18. The float 16 comes first into contact with the closure and is held stationary while the mercury is forced through the bore 16a and the clearance space 16c and some of it is bound to pass over the top of the float. As the mercury column recedes, the mercury on top of the float must fall by gravity and of necessity must roll into bore 16a. The clearance space 16c is very small and the surface tension of globules of mercury relatively large so that any drops or globules of mercury must drop as a unit into and through the bore 16a.

In shipment, the float may be put in place and shipped in operative position. In a horizontal position, the mercury is free to pass through and by the float, but when the apparatus is placed in upright position, the float is bound to rise and the mercury can readily flow from the space above the float through the bore to the body of mercury below it.

It is thus possible to correctly calibrate the gauge and then ship without the necessity of any derangement, adjustment or change of any kind.

The central bore 16a has a tendency to center the float upon the meniscus and to retain its position.

I claim:

1. In an instrument of the character described, the combination with a glass tube containing a column of mercury, of a cylindrical float adapted to rest upon the mercury column having an axial longitudinal bore widening toward its ends substantially to the periphery of the float.

2. In an instrument of the character described, the combination with a glass tube containing a column of mercury, of a cylindrical float adapted to rest upon the mercury column having an axial longitudinal bore terminating at its ends in enlarged cone-shaped portions, the float having an exterior diameter approaching that of the bore of the tube.

3. In an instrument of the character described, the combination with a glass tube containing a column of mercury, of a cylindrical body having an axial longitudinal bore, said body being adapted to rest entirely upon the surface of the mercury column and having a diameter substantially equal to the diameter of the bore of the tube.

In testimony whereof I affix my signature.

GEORGE B. IRELAND.